(12) United States Patent
Park et al.

(10) Patent No.: US 12,217,455 B2
(45) Date of Patent: Feb. 4, 2025

(54) METHOD FOR PROVIDING CONTENT USING MARKER AND ELECTRONIC DEVICE SUPPORTING THE SAME

(71) Applicants: WOONGJIN THINKBIG CO., LTD., Paju-si (KR); ARTYGENSPACE CO., LTD., Seoul (KR)

(72) Inventors: Jeongwook Park, Paju-si (KR); Hwanseok Choi, Paju-si (KR); Hyojin Kim, Paju-si (KR); Jungwoo Choi, Seoul (KR); Youngsun Seo, Seoul (KR)

(73) Assignees: WOONGJIN THINKBIG CO., LTD., Paju-si (KR); ARTYGENSPACE CO., LTD., Seoul (KR)

( * ) Notice: Subject to any disclaimer, the term of this patent is extended or adjusted under 35 U.S.C. 154(b) by 408 days.

(21) Appl. No.: 17/720,946

(22) Filed: Apr. 14, 2022

(65) Prior Publication Data

US 2023/0215037 A1    Jul. 6, 2023

(30) Foreign Application Priority Data

Dec. 30, 2021    (KR) .................. 10-2021-0193201
Mar. 22, 2022    (KR) .................. 10-2022-0035089

(51) Int. Cl.
*G06T 7/73*        (2017.01)
*G06T 11/20*       (2006.01)
*G06T 19/00*       (2011.01)

(52) U.S. Cl.
CPC .............. *G06T 7/73* (2017.01); *G06T 11/203* (2013.01); *G06T 19/006* (2013.01); *G06T 2207/30204* (2013.01)

(58) Field of Classification Search
CPC ....... G06T 7/73; G06T 11/203; G06T 19/006; G06T 2207/30204; G06T 11/00; G06T 11/60; G06F 3/011; A63F 13/213
See application file for complete search history.

(56) References Cited

U.S. PATENT DOCUMENTS 6,954,728 B1    10/2005    Kusumoto et al.
7,882,222 B2    2/2011     Dolbier et al.
(Continued)

FOREIGN PATENT DOCUMENTS

JP    H08211926 A   *  8/1996  ............. G05B 23/02
KR    10-0912264 B1    8/2009
(Continued)

OTHER PUBLICATIONS

Translation of KR-20180010724-A (foreign document provided by applicant) (Year: 2018).*
(Continued)

*Primary Examiner* — Aaron W Carter
(74) *Attorney, Agent, or Firm* — Jefferson IP Law, LLP

(57) ABSTRACT

A method for providing content using a marker by an electronic device is provided. The method comprise obtaining an image for a first marker through a camera, obtaining a first content corresponding to the first marker and a position of the first marker, based on the image, obtaining a second content corresponding to a second marker and a position of the second marker, based on information received from an external electronic device, and obtaining a third content by combining the first content and the second content based on the position of the first marker and the position of the second marker.

10 Claims, 13 Drawing Sheets

(56) References Cited

U.S. PATENT DOCUMENTS

| | | | |
|---|---|---|---|
| 10,857,450 B1 * | 12/2020 | Aman | A63F 3/00 |
| 2009/0077161 A1 | 3/2009 | Hamilton, II et al. | |
| 2010/0321540 A1 | 12/2010 | Woo et al. | |
| 2012/0198021 A1 * | 8/2012 | Ahn | G06F 15/16 |
| | | | 709/217 |
| 2012/0218299 A1 * | 8/2012 | Hayakawa | G09G 5/00 |
| | | | 345/633 |
| 2020/0192963 A1 * | 6/2020 | Lee | G06V 20/20 |
| 2023/0215037 A1 * | 7/2023 | Park | G06T 19/006 |
| | | | 382/103 |
| 2023/0215127 A1 * | 7/2023 | Park | G06T 19/006 |
| | | | 382/209 |
| 2023/0215218 A1 * | 7/2023 | Park | G06F 3/042 |
| | | | 345/156 |

FOREIGN PATENT DOCUMENTS

| | | |
|---|---|---|
| KR | 10-1221169 B1 | 1/2013 |
| KR | 10-1271421 B1 | 6/2013 |
| KR | 10-2017-0086201 A | 7/2017 |
| KR | 10-2018-0010724 A | 1/2018 |
| KR | 10-2020-0057196 A | 5/2020 |
| WO | WO-2019071378 A1 * | 4/2019 ........... G06F 3/0488 |

OTHER PUBLICATIONS

Korean Office Action dated Jan. 4, 2023, issued in Korean Patent Application No. 10-2022-0035089.

* cited by examiner

METHOD FOR PROVIDING CONTENT USING MARKER AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2021-0193201, filed on Dec. 30, 2021, in the Korean Intellectual Property Office, and of a Korean patent application number 10-2022-0035089, filed on Mar. 22, 2022, in the Korean Intellectual Property Office, the disclosure of each of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) WOONGJIN THINKBIG CO., LTD. and 2) ARTYGENSPACE CO., LTD..

TECHNICAL FIELD

The disclosure relates to a method for providing content using a marker in a metaverse and an electronic device supporting the same.

DESCRIPTION OF RELATED ART

A metaverse may refer to a space (e.g., a virtual environment) in which virtual worlds and the real world interact. As interest in metaverse increases, metaverse technology is being implemented in various industries for purposes of politics, administration, business operation, marketing, advertisement, and education. For example, in the field of advertisement or education, a metaverse technology for providing content using an avatar corresponding to the user is being implemented. As another example, a metaverse technology that provides an augmented image by synthesizing an image of a real object and an image of a virtual object obtained through a camera is being implemented.

An electronic device may obtain an image for a marker through the camera and may obtain content (or object) corresponding to the marker based on the obtained image. The electronic device may display the obtained content through a display.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method for providing content using a marker, for providing various contents in a metaverse, based on information about markers respectively obtained by a plurality of electronic devices, and an electronic supporting the same.

Objects of the embodiments are not limited to the foregoing, and other unmentioned objects would be apparent to one of ordinary skill in the art from the following description.

In accordance with an aspect of the disclosure, a method for providing content using a marker by an electronic device is provided. The method comprises obtaining an image for a first marker through a camera, obtaining a first content corresponding to the first marker and a position of the first marker, based on the image, obtaining a second content corresponding to a second marker and a position of the second marker, based on information received from an external electronic device, and obtaining a third content by combining the first content and the second content based on the position of the first marker and the position of the second marker.

In accordance with another aspect of the disclosure, a non-transitory computer-readable medium storing one or more programs is provided. The one or more programs comprises instructions configured to, when executed by at least one processor of an electronic device, enable the electronic device to obtain an image for a first marker through a camera, obtain a first content corresponding to the first marker and a position of the first marker, based on the image, obtain a second content corresponding to a second marker and a position of the second marker, based on information received from an external electronic device, and obtain a third content by combining the first content and the second content based on the position of the first marker and the position of the second marker.

In accordance with another aspect of the disclosure, a method for providing content using a marker by an electronic device is provided. The method comprises obtaining an image for a first marker through a camera while the content is provided, obtaining a first object corresponding to the first marker and a position of the first marker, based on the image, obtain a second object corresponding to a second marker and a position of the second marker, based on information received from an external electronic device, and obtain a third object by combining the first object and the second object based on the position of the first marker and the position of the second marker.

In accordance with another aspect of the disclosure, the method for providing content using a marker and electronic device supporting the same provides game-related content (e.g., a map used in a puzzle game) based on information about markers (e.g., puzzle markers) respectively obtained by a plurality of electronic devices.

In accordance with another aspect of the disclosure, the method for providing content using a marker and electronic device supporting the same provides game-related content (e.g., augmented reality effect) based on information about markers respectively obtained by a plurality of electronic devices while a game application is running.

BRIEF DESCRIPTION OF THE DRAWINGS

A more complete appreciation of embodiments and many of the attendant aspects thereof will be readily obtained as the same becomes better understood by reference to the following detailed description when considered in connection with the accompanying drawings, wherein.

DETAILED DESCRIPTION

Figure 1:
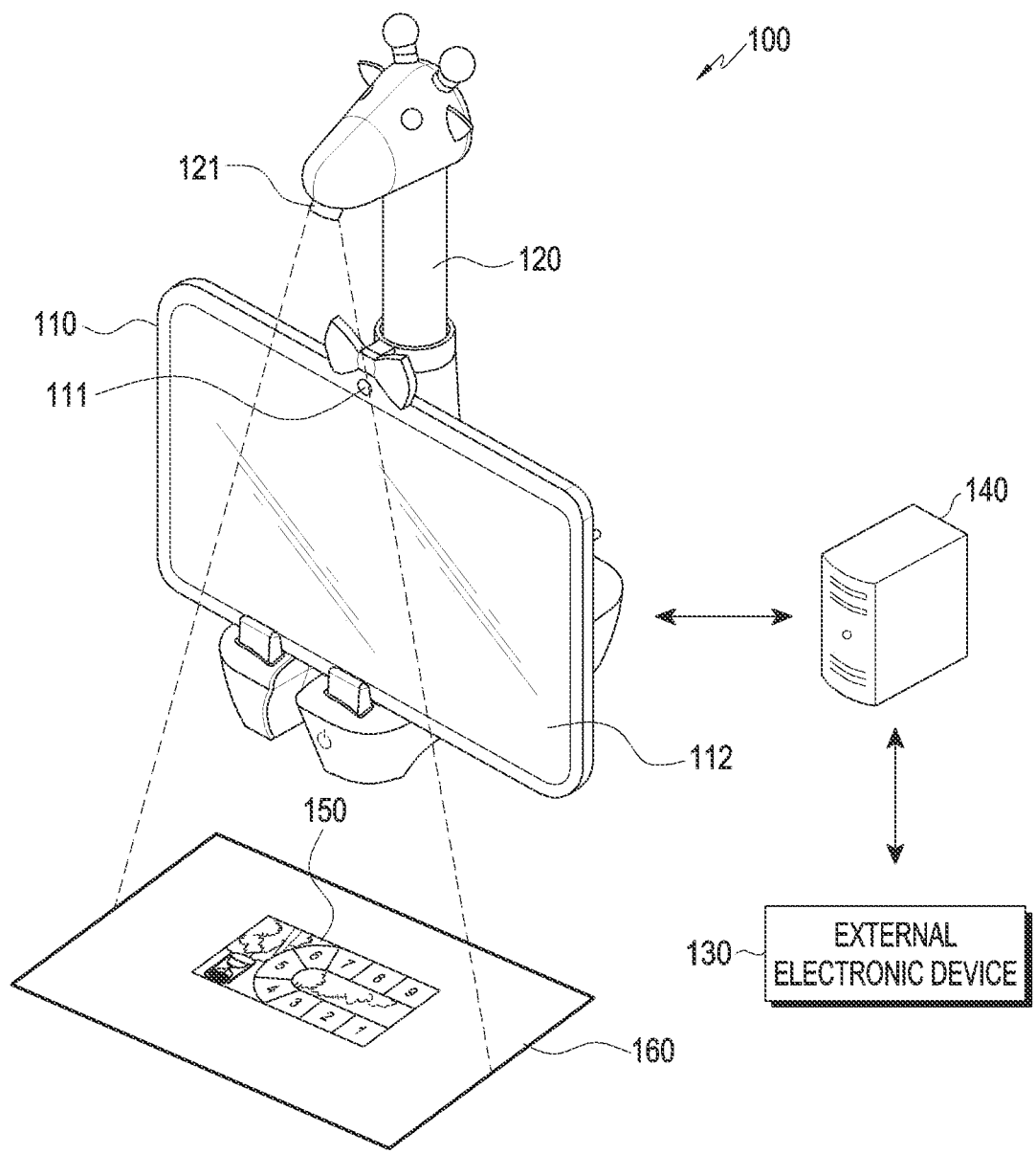
FIG. 1 is a view illustrating a method for providing content using a marker according to various embodiments.

As embodiments disclosed herein are provided to provide a clear description of the spirit of the embodiments to one of ordinary skill in the art, the embodiments are not limited to the disclosed embodiments. According to various embodiments, the scope of the embodiments should be interpreted as including modifications or changes thereto without departing from the spirit of the embodiments.

Although terms commonly and widely used are adopted herein considering the functions in the embodiments, other terms may also be used depending on the intent of one of ordinary skill in the art, custom, or advent of new technology. For specific terms, their definitions may be provided. Accordingly, the terms used herein should be determined based on their meanings and the overall disclosure, rather than by the terms themselves.

The accompanying drawings are provided for a better understanding of the embodiments. Some views may be exaggerated in aid of understanding as necessary. The disclosure is not limited to the drawings.

When determined to make the gist of the embodiments unclear, a detailed description of known configurations or functions may be omitted as necessary.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

According to embodiments, the operations of the machine (e.g., the electronic device 110, camera device 120, external electronic device 130, and server 140 of FIG. 1) may be implemented as software (e.g., a program) including one or more instructions stored in a recording medium (or storage medium) readable by the machine. For example, the control circuit (e.g., a processor) of the machine (e.g., the electronic device 110, external electronic device 130, camera device 120, or server 140 of FIG. 1) may invoke at least one instruction among one or more instructions stored in the recording medium, from the recording medium and execute the invoked instruction. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a view 100 illustrating a method for providing content using a marker according to various embodiments.

In an embodiment, FIG. 1 may be a view for describing a system for performing a method for providing content using a marker.

Referring to FIG. 1, a system for performing a method for providing content using a marker may include an electronic device 110, a camera device 120, an external electronic device 130, and a server 140.

According to an embodiment, the electronic device 110 (e.g., a smartphone or tablet) may obtain an image for a marker 150 disposed (e.g., placed) on a guide, through a camera. For example, the electronic device 110 may receive, from the camera device 120, an image for the marker 150 obtained through a first camera 121 of the camera device 120 (hereinafter, referred to as a 'first camera'). As another example, the electronic device 110 may obtain the image for the marker 150 through a second camera 111 included in the electronic device 110 (hereinafter, referred to as a 'second camera').

According to an embodiment, the marker 150 may be an object recognizable by the electronic device 110. For example, the marker 150 may include a three-dimension (3D) object (e.g., a puzzle marker described below) including at least one surface printed with an image and/or text recognizable by the electronic device 110. As another example, the marker 150 may include an object (e.g., a connection marker described below) having a shape recognizable by the electronic device 110. As another example, the marker 150 may be a flat plate-shaped card (e.g., a puzzle card) printed with an image and/or text recognizable by the electronic device 110.

According to an embodiment, the guide 160 (e.g., a rectangular piece of paper) may be used for the electronic device 110 to obtain the position of the marker 150. For example, in a state in which the marker 150 is disposed (e.g., placed) on the guide 160, the electronic device 110 may obtain an image for the marker 150 and the guide 160 (e.g., the contour of the guide 160) through a camera. The electronic device 110 may determine the position of the marker 150 (e.g., coordinates of the image area representing the marker 150) in the guide 160 (e.g., the area surrounded by the contour of the guide) based on the obtained image.

According to an embodiment, the guide 160 may be omitted. Even when the guide 160 is not used (e.g., when the marker 150 is not placed on the guide 160), the electronic device 110 may obtain the position of the marker 150. For example, when the marker 150 is disposed on the ground (e.g., on a desk), the electronic device 110 may obtain an image for the marker 150 positioned in the field-of-view (FOV) of the camera, through the camera. The electronic device 110 may determine the position of the marker 150 in the obtained image.

According to an embodiment, the camera device 120 may obtain the image through the first camera 121. For example, the camera device 120 may obtain the image for the marker 150 positioned in the field-of-view of the first camera 121 through the first camera 121.

According to an embodiment, the camera device 120 may transmit the obtained image for the marker 150 to the electronic device 110 through a communication module (e.g., a wireless communication module or a wired communication module).

According to an embodiment, the camera device 120 may mount the electronic device 110 thereon. For example, the camera device 120 may include a housing implemented to be able to mount the electronic device 110 as shown in FIG. 1.

According to an embodiment, the external electronic device 130 may be an electronic device 110 that includes substantially the same configuration as the electronic device 110 and performs the same functions as those of the electronic device 110. According to an embodiment, when the electronic device 110 is a first user's electronic device 110, the external electronic device 130 may be a second user's electronic device.

According to an embodiment, the external electronic device 130 may transmit, through the communication module, the image for the marker obtained by the external electronic device 130, content corresponding to the marker obtained from the image obtained by the external electronic device 130, and information about the marker, to the electronic device via the server 140 (or directly).

Although FIG. 1 illustrates one external electronic device (e.g., the external electronic device 130), the embodiments are not limited thereto, and a system providing content using a marker may include a plurality of external electronic devices.

In an embodiment, the server 140 may communicate with the electronic device 110 and/or the external electronic device 130 through the communication module. In an embodiment, the server 140 may perform some of the operations for the electronic device 110 to provide content using a marker as described below.

In an embodiment, the electronic device 110 may obtain content based on the image for the marker 150 obtained through the camera (e.g., the first camera 121 or the second camera 111) and the information about the marker identified from the external electronic device 130. The electronic device 110 may display the obtained content through the display 112. The operation for the electronic device to obtain content based on the image for the marker 150 obtained through the camera (e.g., the first camera 121 or the second camera 111) and the information about the marker obtained from the external electronic device 130 is described below.

Figure 2:
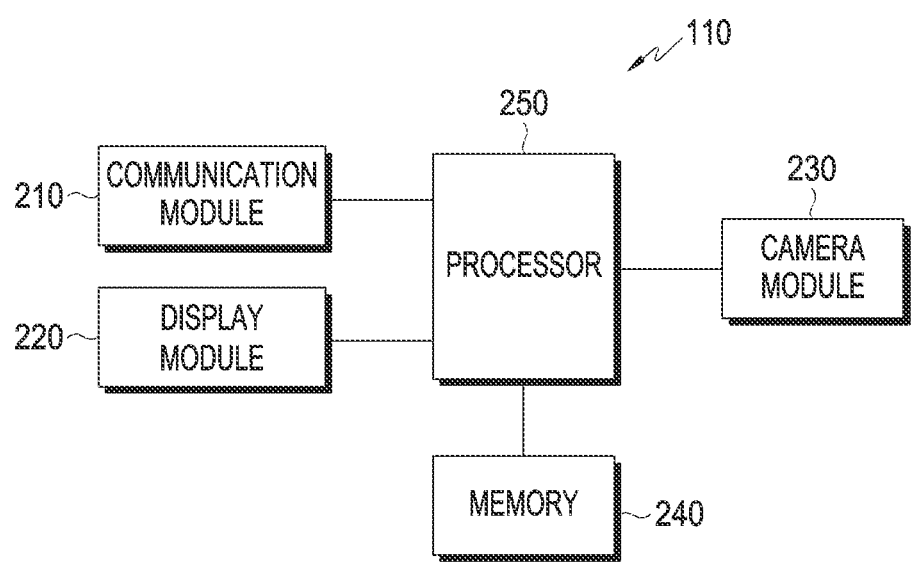
FIG. 2 is a block diagram illustrating an electronic device according to various embodiments.

FIG. 2 is a block diagram illustrating an electronic device 110 according to various embodiments.

Referring to FIG. 2, in an embodiment, an electronic device 110 may include a communication module 210, a display module 220, a camera module 230, a memory 240, and/or a processor 250.

In an embodiment, the communication module 210 may support establishing a direct (e.g., wired) communication channel or a wireless communication channel between the electronic device 110 and another electronic device (e.g., at least one of the camera device 120, the external electronic device 130, or the server 140) and performing communication via the established communication channel.

According to an embodiment, the communication module 210 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module).

According to an embodiment, the display module 220 (e.g., the display module 112 of FIG. 1) may visually provide information to the outside (e.g., a user) of the electronic device 110. The display module 220 may include a display, a hologram device, or a projector and control circuitry to control a corresponding one of the display, hologram device, and projector. According to an embodiment, the display module 220 may include a touch sensor configured to detect a touch, or a pressure sensor configured to measure the intensity of a force generated by the touch.

In an embodiment, the camera module 230 may include a camera (e.g., the second camera 111 of FIG. 1) for capturing still images and moving images. According to an embodiment, the camera module 230 may include one or more lenses, image sensors, image signal processors, or flashes.

According to an embodiment, the memory 240 may store various data used by at least one component (e.g., the processor 250) of the electronic device 110.

According to an embodiment, the memory 240 may store information for performing the operation of providing content using a marker. According to an embodiment, the memory 240 may store one or more programs including instructions for performing the operation of providing content using a marker.

According to an embodiment, the processor 250 may execute, for example, software (e.g., a program) to control at least one other component (e.g., a hardware or software component) of the electronic device 110 coupled with the processor 250, and may perform various data processing or computation.

According to an embodiment, the processor 250 may control the overall operation for providing content using a marker. According to an embodiment, the processor 250 may include one or more processors for performing the operation of providing content using a marker. The operation of providing content using a marker by the processor 250 is described below with reference to FIG. 3.

Although it is exemplified that in FIG. 2, the electronic device 110 includes the communication module 210, the display module 220, the camera module 230, the memory 240, and/or the processor 250, the electronic device 110 may add other components than those shown in FIG. 2 or may exclude some of the components shown in FIG. 2. For example, the electronic device 110 may further include an input module (e.g., a microphone, a mouse, a keyboard, a key (e.g., a button), or a digital pen (e.g., a stylus pen)) capable of receiving, from the outside (e.g., the user) of the electronic device 110, instructions or data to be used by a component (e.g., the processor 250) and a sound output module capable of outputting sound signals to the outside of the electronic device 110. As another example, in a case where the processor 250 performs the operation of providing content using a marker based on the image received from the camera device 120, the camera module 230 may not be included.

Although not shown in FIG. 2, the external electronic device 130 may include the same components as those of the electronic device 110.

Figure 3:
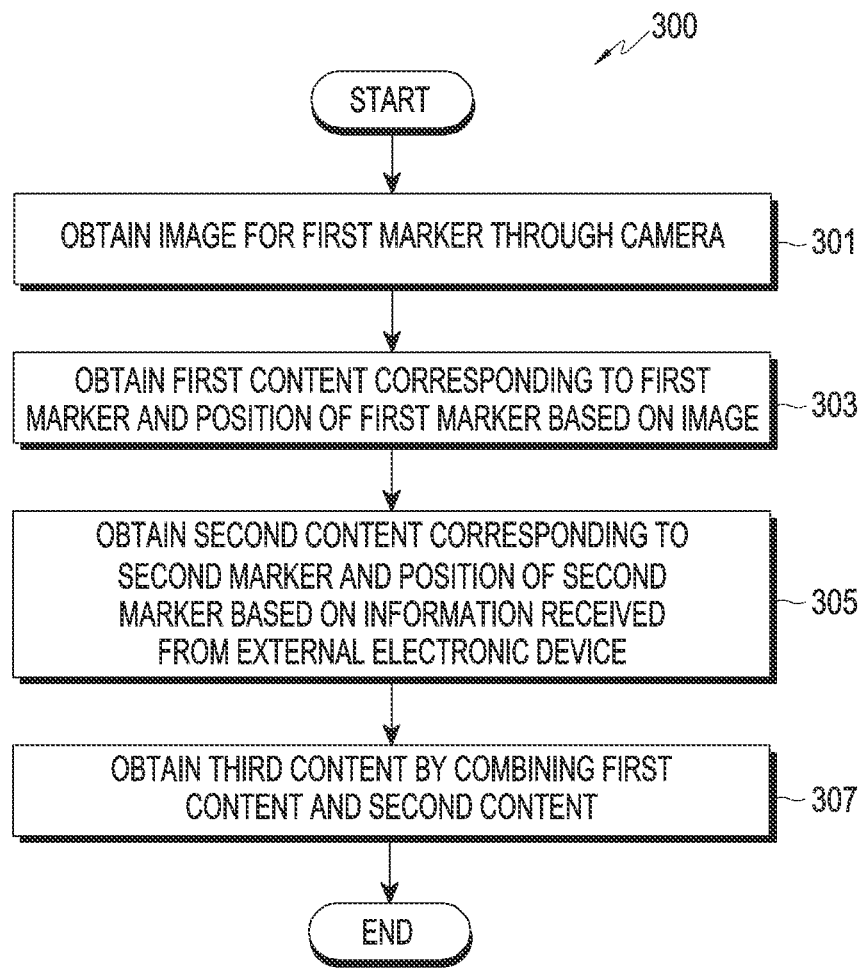
FIG. 3 is a flowchart illustrating a method for providing content using a marker according to various embodiments.

FIG. 3 is a flowchart 300 illustrating a method for providing content using a marker according to various embodiments.

Figure 4:
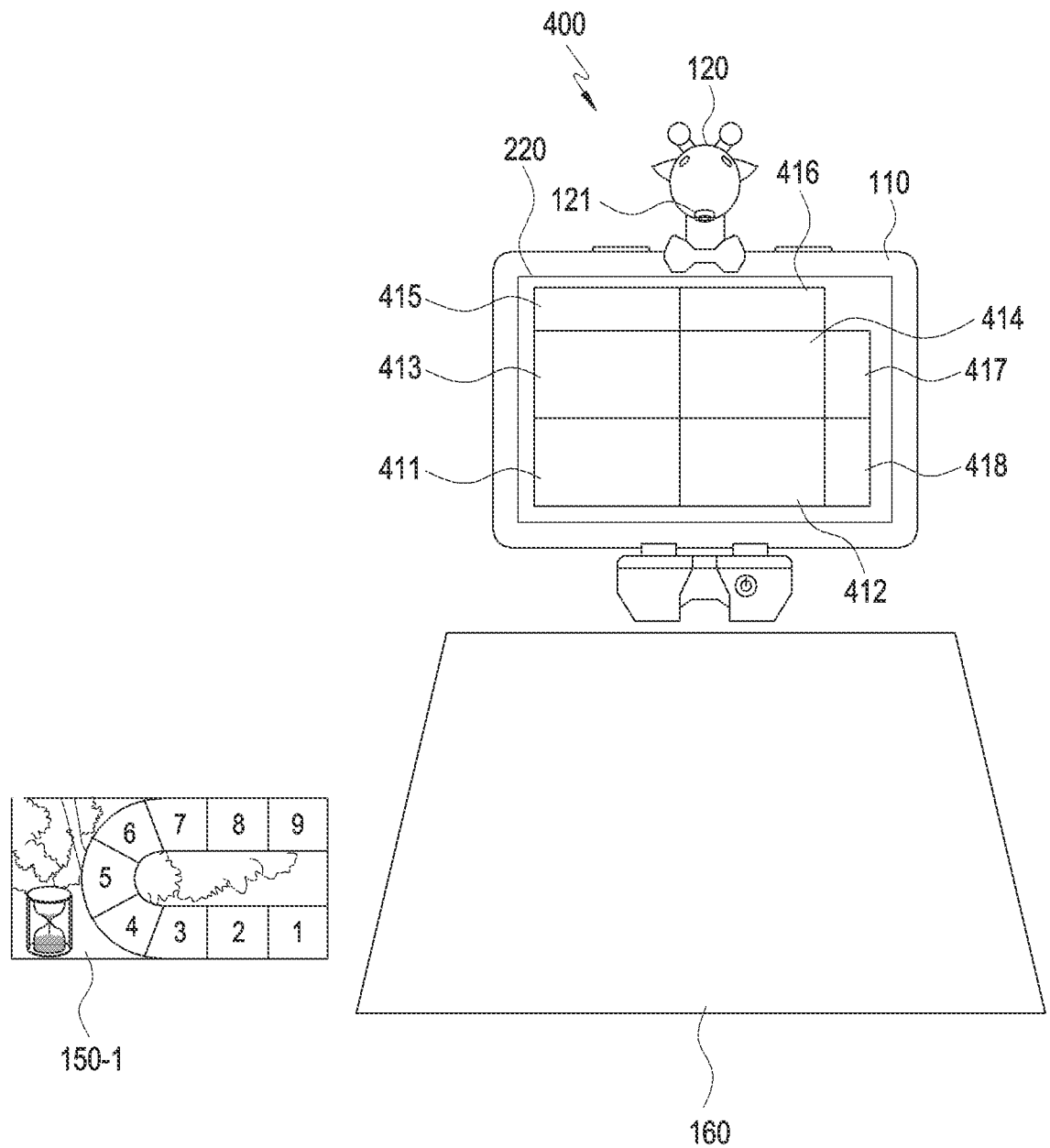
FIG. 4 is a view illustrating a method for providing a game map using a marker according to various embodiments.

FIG. 4 is a view 400 illustrating a method for providing a game map using a marker according to various embodiments.

Figure 5:
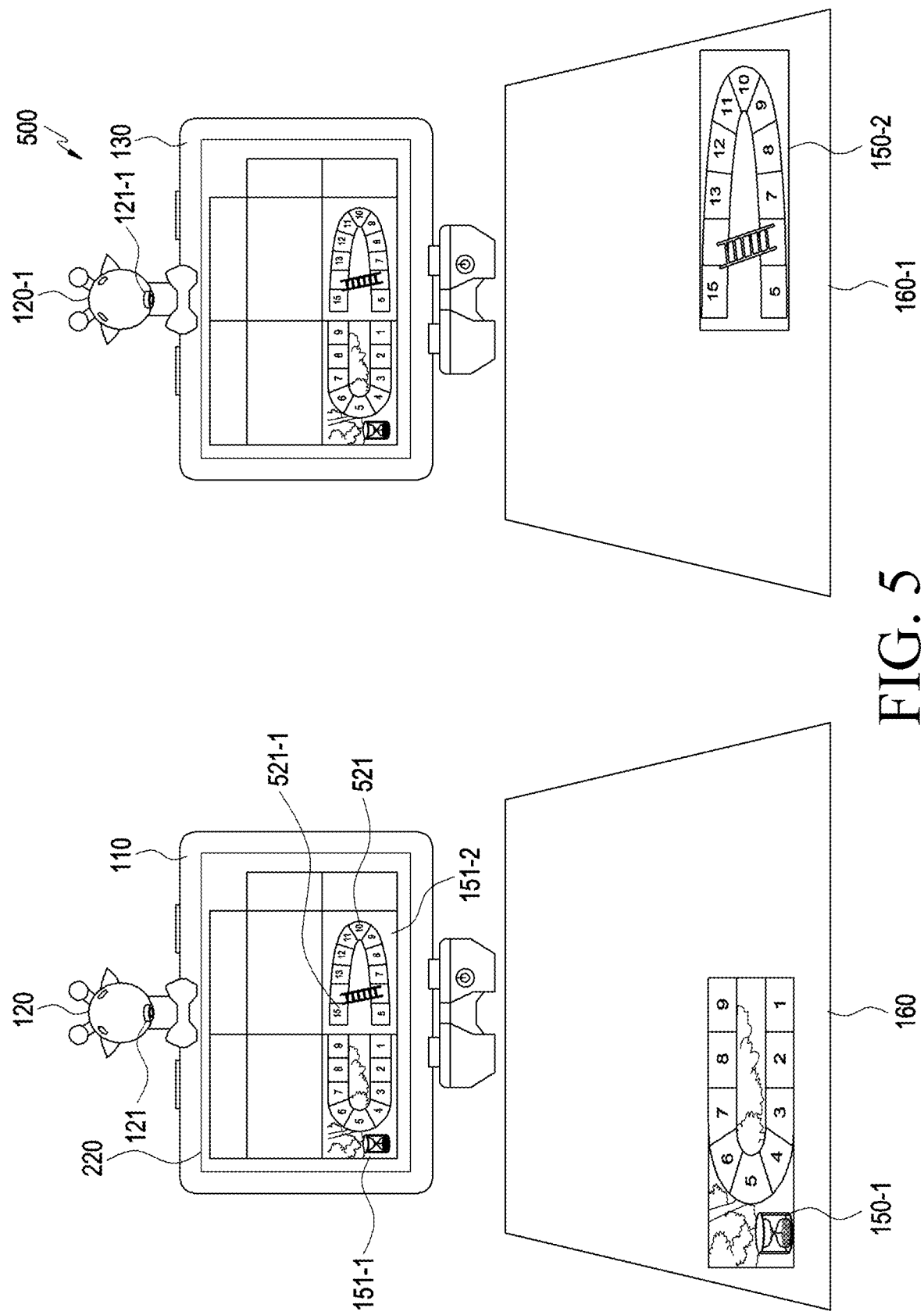
FIG. 5 is a view illustrating a method for providing a game map using a marker according to various embodiments.

FIG. 5 is a view 500 illustrating a method for providing a game map using a marker according to various embodiments.

Figure 6A:
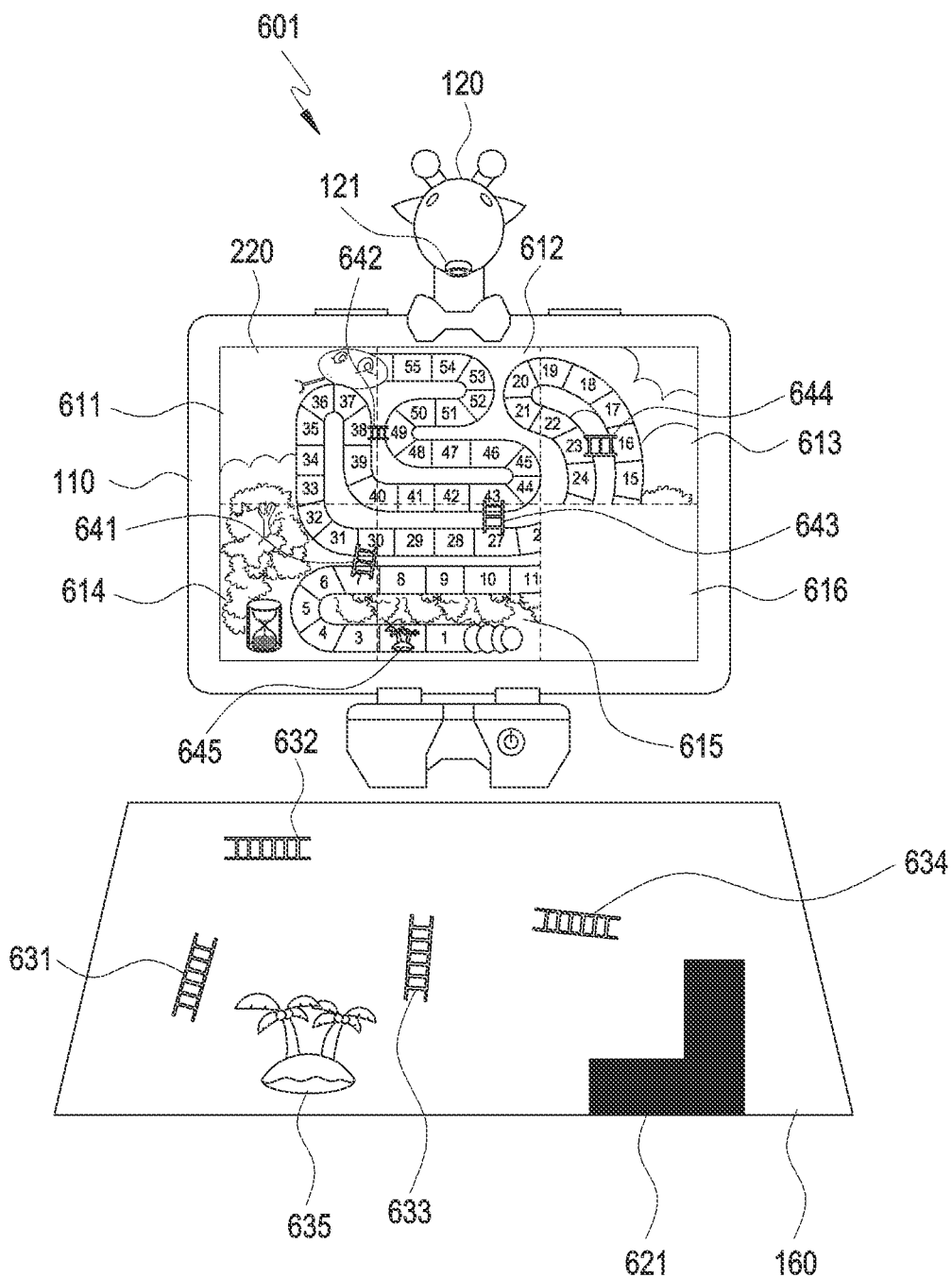
FIGS. 6A and 6B are views illustrating a method for providing a game map using a marker according to various embodiments.
Figure 6B:
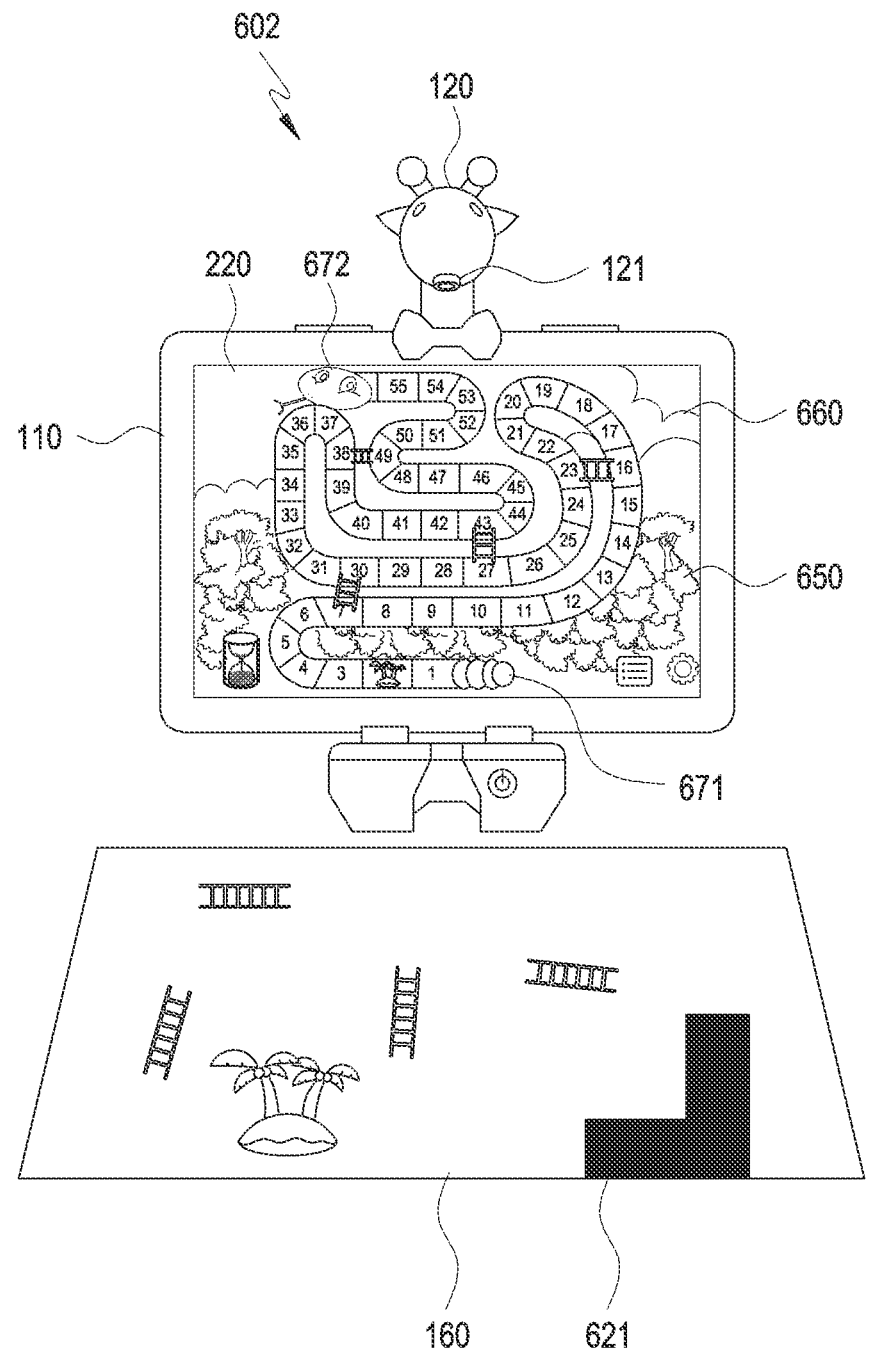

FIGS. 6A and 6B are views 601 and 602 illustrating a method for providing a game map using a marker according to various embodiments.

Referring to FIGS. 3 to 6B, in operation 301, according to an embodiment, the processor 250 may obtain an image for a first marker through a camera (e.g., the first camera 121 or the second camera 111).

According to an embodiment, the processor 250 may execute an application based on a user input. For example, the processor 250 may execute a puzzle game application that may be performed by a plurality of electronic devices of a plurality of users based on a user input. However, the application executed by the processor 250 is not limited to the puzzle game application.

According to an embodiment, when an application (e.g., the puzzle game application) is executed, the processor 250 may split the screen of the display module 220 to display at least one content corresponding to at least one marker. For example, as shown in FIG. 4, when the application is executed, the processor 250 may split the screen of the display module 220 into a plurality of screen areas 411, 412, 413, and 414 respectively corresponding to the positions of the plurality of markers to display a plurality of contents corresponding to the plurality of markers. In FIG. 4, four screen areas 411, 412, 413, and 414 are exemplified, but the embodiments are not limited thereto. The processor 250 may split the screen of the display module 220 into a plurality of screen areas (e.g., two screen areas horizontally and one screen area vertically), fewer than four, or a plurality of screen areas (e.g., four screen areas horizontally and four screen areas vertically), more than four, depending on the number of markers recognized by the images obtained by each of the electronic device 110 and/or the external electronic device 130. In FIG. 4, the screen areas 415, 416, 417, and 418 may represent screen areas that may be further split.

According to an embodiment, the processor 250 may determine (or adjust) the number of the plurality of split screen areas based on the number of markers (and positions of markers) obtained from the information received from the external electronic device 130 and/or the number of markers (and positions of markers) included in the image obtained through the camera (e.g., the first camera 121 or the second camera 111).

According to an embodiment, when the application is executed, the processor 250 may obtain an image for a first marker through the camera (e.g., the first camera 121 or the second camera 111). For example, the processor 250 may obtain the image for the first marker by receiving the image for the first marker obtained using the first camera 121 of the camera device 120, through the communication module 210. As another example, the processor 250 may obtain the image for the first marker through the second camera 111.

Hereinafter, for convenience of description, the marker which is the target to be captured by the first camera 121 and/or the second camera 111 is denoted as a "first marker." For example, the first marker may denote a marker used for the user of the electronic device 110 to obtain (e.g., generate) a map of the puzzle game.

According to an embodiment, the first marker may be an object recognizable by the electronic device 110. For example, the first marker may include a three-dimension (3D) object (e.g., a puzzle marker) including at least one surface printed with an image and/or text recognizable by the electronic device 110. As another example, the first marker may be a flat plate-shaped card (e.g., a puzzle card) printed with an image and/or text recognizable by the electronic device 110.

According to an embodiment, when the first marker 150-1 is disposed (e.g., placed) on a guide 160, the processor 250 may obtain an image for the first marker 150-1 and the guide 160 through the camera. For example, in a state in which the first marker 150-1 is placed on the guide 160, the processor 250 may obtain an image for at least a portion of the contour of the guide 160 (or the area of the guide) together with the first marker 150-1 through the camera (e.g., the first camera 121 or the second camera 111).

According to an embodiment, the guide 160 (e.g., a rectangular piece of paper) may be used to obtain the position of the first marker 150-1 and be omitted according to an embodiment.

In operation 303, according to an embodiment, the processor 250 may obtain the position of the first marker and first content corresponding to the first marker based on the image obtained through the camera (hereinafter, denoted as a "first image").

According to an embodiment, the processor 250 may obtain the first content corresponding to (e.g., mapped to) the first marker based on the first image. For example, the processor 250 may recognize the image (and/or text) printed on at least one surface of the first marker in the first image. The processor 250 may identify the content mapped to the recognized image and stored in the memory 240 (hereinafter, denoted as a "first content") (or object).

According to an embodiment, when the application executed on the electronic device 110 is a puzzle game application, and the first marker is a puzzle marker, the first content may be part of the puzzle map corresponding to the first marker.

According to an embodiment, the processor 250 may obtain the position of the first marker based on the first image. For example, the processor 250 may identify the position of the area of the guide in the first image (e.g., the area indicating the guide in the first image) and the position of the area of the first marker (e.g., the image area indicating the first marker in the first image). The processor 250 may determine that the position of the area of the first marker in the area of the guide is the position of the first marker. As another example, the processor 250 may identify that the first image does not include the area of the guide. In this case, the processor 250 may identify the position of the area of the first marker in the first image (e.g., the first image corresponding to the field-of-view of the camera). The processor 250 may determine that the identified position of the first marker in the first image is the position of the first marker.

In operation 305, according to an embodiment, the processor 250 may obtain the second content corresponding to the second marker and the position of the second marker, based on information received from the external electronic device 130 through the communication module 210.

For convenience of description, the marker which is the target to be captured by the camera module 121-1 included in the external electronic device 130 or the camera device 120-1 obtaining an image and transmitting the obtained image to the external electronic device 130 is denoted as a "second marker." For example, the second marker may denote a marker used for the user of the external electronic device 130 to obtain (e.g., generate) a map of the puzzle game.

According to an embodiment, the processor 250 may receive information including the second content corresponding to the second marker (hereinafter, denoted as a "second content") and the position of the second marker, from the external electronic device 130 (or server) through the communication module 120. According to an embodiment, the external electronic device 130 may perform substantially the same operations as operations 301 and 303 described above. For example, the external electronic device 130 may obtain the image for the second marker through a camera related to the external electronic device 130 (e.g., the camera device obtaining the image and transmitting the obtained image to the external electronic device 130 or the camera module included in the external electronic device 130). The external electronic device 130 may obtain the second content corresponding to the second marker and the position of the second marker based on the obtained image. The external electronic device 130 may transmit information including the obtained second content and position of the second marker to the electronic device 110. The electronic device 110 may receive the information including the second content and the position of the second marker, transmitted by the external electronic device 130.

According to an embodiment, the processor 250 may receive information including the image for the second marker (hereinafter, denoted as a "second image") from the external electronic device 130 (or server 140) through the communication module 210. The processor 250 may obtain the second content corresponding to the second marker and the position of the second marker based on the second image. For example, the processor 250 may obtain the second content corresponding to the second marker, based on the second image. The processor 250 may recognize the image (and/or text) printed on at least one surface of the second marker in the second image. The processor 250 may identify the second content mapped to the recognized image and stored in the memory 240. The processor 250 may obtain the position of the second marker based on the second image. For example, the processor 250 may identify the position of the area of the guide in the second image (e.g., the area indicating the guide in the second image) and the position of the area of the second marker (e.g., the image area indicating the second marker in the second image). The processor 250 may determine that the position of the area of the second marker in the area of the guide is the position of the second marker. As another example, the processor 250 may determine that the identified position of the second marker in the second image is the position of the second marker.

In operation 307, according to an embodiment, the processor 250 may obtain the third content by combining the first content and the second content based on the position of the first marker and the position of the second marker.

According to an embodiment, the processor 250 may obtain the third content by synthesizing the first content and the second content based on the position of the first marker and the position of the second marker. For example, the processor 250 may obtain the third content, which is obtained by synthesizing the first content and the second content, so that the first content is displayed in the screen area corresponding to the position of the first marker, and the second content is displayed in the screen area corresponding to the position of the second marker.

According to an embodiment, the processor 250 may obtain the third content by changing part of the first content and/or part of the second content based on the position of the first marker and the position of the second marker. For example, the processor 250 may obtain (e.g., generate) a path in which the game pieces respectively corresponding to the users of the electronic device 110 and the external electronic device 130 move, while the puzzle game is played, based on the position of the first marker, the position of the second marker, the part of the puzzle map included in the first content 151-1, and the part of the puzzle map included in the second content 151-2. The processor 250 may change the number in the object constituting the path in which the game piece moves on the puzzle map included in the first content and/or the number (e.g., the number "15" 521-1 of FIG. 5) in the object (e.g., the object 521 of FIG. 5) constituting the path in which the game piece moves on the puzzle map included in the second content into a number for playing the puzzle game (e.g., change the number "15" 521-1 of FIG. 5 into the number "10" which is the next number to the number "9" in the object connected with the object 521). The processor 250 may obtain the third content based on the obtained path in which the game pieces move and the changed number.

According to an embodiment, the processor 250 may obtain the third content (a puzzle map in which the puzzle map part corresponding to the first marker and the puzzle map part corresponding to the second marker are combined) by combining the first content corresponding to the first marker (e.g., the puzzle map part corresponding to the first marker) and the second content corresponding to the second marker (e.g., the puzzle map part corresponding to the second marker) based on the position of the first marker and the position of the second marker. The processor 250 may identify the first screen area and the second screen area of the display module 220, respectively corresponding to the position of the first marker and the position of the second marker, for the third content. The processor 250 may display the third content through the identified first screen area and second screen area.

According to an embodiment, the processor 250 may identify the first screen area and second screen area of the display module 220 respectively corresponding to the position of the first marker and the position of the second marker. The processor 250 may display the first content corresponding to the first marker (e.g., the puzzle map part corresponding to the first marker) and the second content corresponding to the second marker (e.g., the puzzle map part corresponding to the second marker) in the identified first screen area and second screen area, respectively. The processor 250 may display the third content obtained by combining the first content and the second content (the puzzle map obtained by combining the puzzle map part corresponding to the first marker and the puzzle map part corresponding to the second marker) by displaying the first content and the second content in the first screen area and the second screen area, respectively. For example, referring to FIGS. 4 and 5, according to an embodiment, the processor 250 may identify that the position of the first marker 150-1 corresponds to the screen area 411 of the display module 220, and the position of the second marker 150-2 corresponds to the screen area 412 of the display module 220. The processor 250 may display the first content (e.g., part of the puzzle map) corresponding to the first marker 150-1 in the screen area 411 and display the second content (e.g., part of the puzzle map) corresponding to the second marker in the screen area 412. The processor 250 may display the third content (e.g., puzzle map), obtained by combining the first content and the second content, by displaying the first content and the second content in the screen area 411 and the screen area 412, respectively.

Although FIG. 5 exemplifies that the processor 250 obtains the third content based on two markers (e.g., the first marker 150-1 and the second marker 150-2), the embodiments are not limited thereto. According to an embodiment, when at least one additional marker is placed on the guide 160 (or the guide 160-1) after the third content is obtained based on the first marker 150-1 and the second marker 150-2, the processor 250 may obtain content based on the at least one additional marker along with the first marker 150-1 and the second marker 150-2. For example, when an additional marker is placed on the guide 160 (or the guide 160-1) after the third content is obtained based on the first marker 150-1 and the second marker 150-2, the processor 250 may obtain an image for the additional marker through the camera. The processor 250 may obtain content corresponding to the additional marker and the position of the additional marker based on the obtained image. The processor 250 may obtain the extended content (e.g., the combined content of the first content, the second content, and the content corresponding to the additional marker) of the third content by the content corresponding to the additional marker by combining the first content, the second content, and the content corresponding to the additional marker, based on the position of the first marker, the position of the second marker, and the position of the additional marker.

According to an embodiment, in FIG. 5, when the third content is obtained, the processor 250 may transmit information related to the third content to the external electronic device 130 through the communication module 210 to allow the external electronic device 130 (e.g., the display module 220-1) to display the third content as does the electronic device 110 (e.g., for the external electronic device 130 and the electronic device 110 to display the same content).

According to an embodiment, the processor 250 may obtain content using a connection marker other than the first marker and the second marker. According to an embodiment, the connection marker may be a marker for displaying, in a screen area where content corresponding to a marker (e.g., the puzzle marker) is not displayed on the screen of the display module 220, content related to the content displayed in a screen area adjacent to the screen area. The connection marker may have a designated shape (e.g., an L shape) or may be implemented in a form printed with a designated image. For example, as shown in FIG. 6A, content obtained based on at least one first marker and at least one second marker may be displayed in a first screen area 611, a second screen area 612, a third screen area 613, a fourth screen area 614, and a fifth screen area 615. In the case of a sixth screen area 616 where puzzle maps, such as the first marker 150-1 and the second marker 150-2, are not used, the processor 250 may obtain content using the connection marker 621. The processor 250 may obtain an image for the connection marker 621 disposed on the guide 160 through the camera. The processor 250 may identify the position of the connection marker 621 based on the obtained image. As another example, the processor 250 may identify the position of the connection marker based on information received from the external electronic device 130 through the communication module 210. The processor 250 may obtain content to be displayed in a screen area (e.g., the screen area 616) corresponding to the position of the connection marker 621 based on content to be displayed in at least one screen area (e.g., the screen area 612, the screen area 613, and the screen area 615) adjacent to the screen area (e.g., the screen area 616) corresponding to the position of the connection marker. For example, in FIG. 6A, when the position of the connection marker 621 corresponds to the screen area 616 adjacent to the screen area 612, the screen area 613, and/or the screen area 615, the processor 250 may identify the content displayed in the screen area 612, the screen area 613, and the screen area 615 adjacent to the screen area 616. In FIG. 6B, the processor 250 may display content 650 matching the identified content displayed in the screen area 612, the screen area 613, and the screen area 615, in the screen area 616 corresponding to the position of the connection marker 621. For example, in FIG. 6B, the processor 250 may display the content 650 in the screen area 616 corresponding to the position of the connection marker 621 so that the path displayed in the identified screen area 612, the screen area 613, and the screen area 615 and in which the game piece moves on the puzzle map is connected with the path in which the game piece included in the content 650 moves.

According to an embodiment, when information (e.g., the content corresponding to the marker and the position of the marker) about the marker having the position corresponding to at least one screen area among the plurality of screen areas of the display module 220 is not obtained, the processor 250 may automatically obtain (e.g., generate) content corresponding to the at least one screen area. As shown in FIG. 6A, when the information (e.g., the content corresponding to the puzzle marker and the position of the puzzle marker) about the puzzle marker having the position corresponding to the screen area 616 among the plurality of screen areas of the display module 220 is not obtained, the processor 250 may obtain the content (e.g., the content 650 of FIG. 6B) to be displayed in the screen area 616 based on the content displayed in at least one screen area (e.g., the screen area 612, the screen area 613, and the screen area 615) adjacent to the screen area 616.

According to an embodiment, the processor 250 may obtain content using an item marker (e.g., a marker having at least one surface printed with an image indicating the item), other than the puzzle marker and the connection marker. For example, in FIG. 6A, the processor 250 may obtain objects 641, 642, 643, 644, and 645 respectively corresponding to item markers 631, 632, 633, 634, and 635 using the item markers 631, 632, 633, 634, and 635. As shown in FIG. 6A, the processor 250 may display the objects 641, 642, 643, 644, and 645 respectively corresponding to the item markers 631, 632, 633, 634, and 635 in the position on the content 660 corresponding to the positions of the item markers 631, 632, 633, 634, and 635, through the display module 220. In FIG. 6A, the trapezoidal objects 641, 642, 643, and 644 may be objects mapped with the function for the game pieces to jump the position while the puzzle game is played. In FIG. 6A, an uninhabited island-shaped object 645 may be an object mapped with the function of skipping the user's turn a designated number of times (e.g., three times) while the puzzle game is played.

According to an embodiment, the puzzle game may be a game which is won by the user of the game piece which first reaches the second position 672, as the target position, starting with the first position 671 as the starting position, among the game pieces, on the content representing the puzzle map of FIG. 6B. Although not shown in FIGS. 6A and 6B, the electronic device 110 (and the external electronic device 130) may move the game piece along the path on the content 660 (e.g., the puzzle map) based on the image for the dice obtained through the camera.

According to an embodiment, the user of the electronic device 110 and the user of the external electronic device 130 may place the first marker 150-1 and the second marker 150-2 so that the position of the content corresponding to the position of the first marker 150-1 (e.g., the screen area corresponding to the position of the first marker 150-1) and the position of the content corresponding to the position of the second marker 150-2 (e.g., the screen area corresponding to the position of the second marker 150-2) are identical (e.g., overlap). In such a case, the processor 250 may assign a higher priority to the marker (or content corresponding to the marker) in the position first obtained of the position of the first marker 150-1 and the position of the second marker 150-2. For example, when the position of the first marker 150-1 and the position of the second marker 150-2 both correspond to the screen area 614 in FIG. 6A, the processor 250 may assign a higher priority to the marker in the position first obtained of the position of the first marker 150-1 and the position of the second marker 150-2 while assigning a lower priority to the marker in the position later obtained. The processor 250 may assign (or display) content corresponding to the marker assigned the higher priority to a corresponding screen area (e.g., the screen area 614). The processor may display the content assigned the higher priority in the corresponding screen area and may not display the content corresponding to the marker assigned the lower priority, through the display module 220.

According to an embodiment, the processor 250 may provide various puzzle maps desired by the user of the electronic device 110 and the user of the external electronic device 130 by obtaining a puzzle map in which parts of the puzzle map are configured in the positions respectively corresponding to the positions of the puzzle markers, using the puzzle markers. For example, the processor 250 may obtain different puzzle maps depending on the positions of the puzzle markers disposed by the user of the electronic device 110 and the user of the external electronic device 130.

Figure 7:
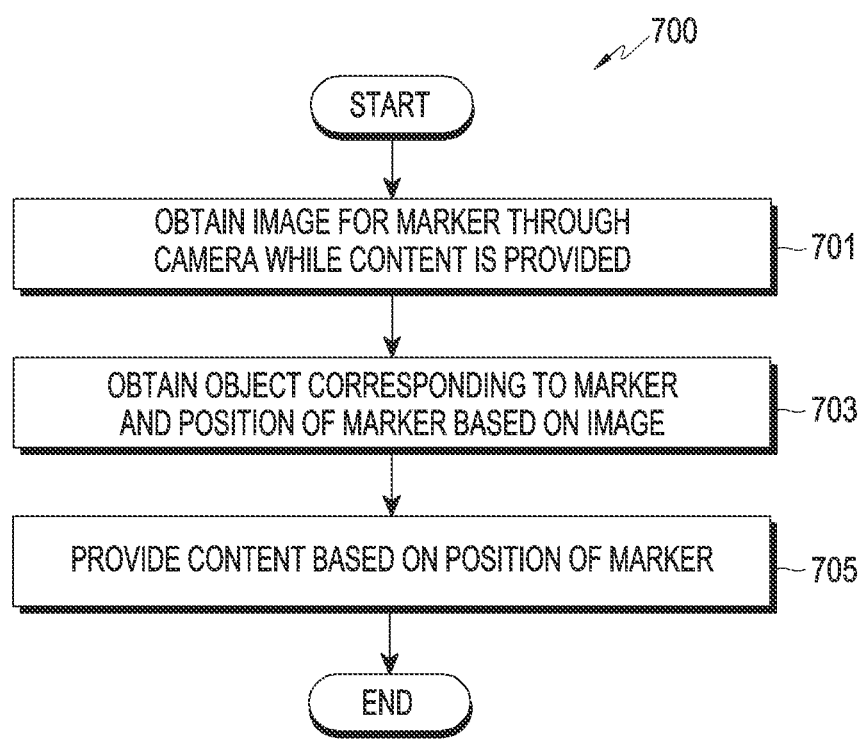
FIG. 7 is a flowchart illustrating a method for providing content using a marker according to various embodiments.

FIG. 7 is a flowchart 700 illustrating a method for providing content using a marker according to various embodiments.

Figure 8:
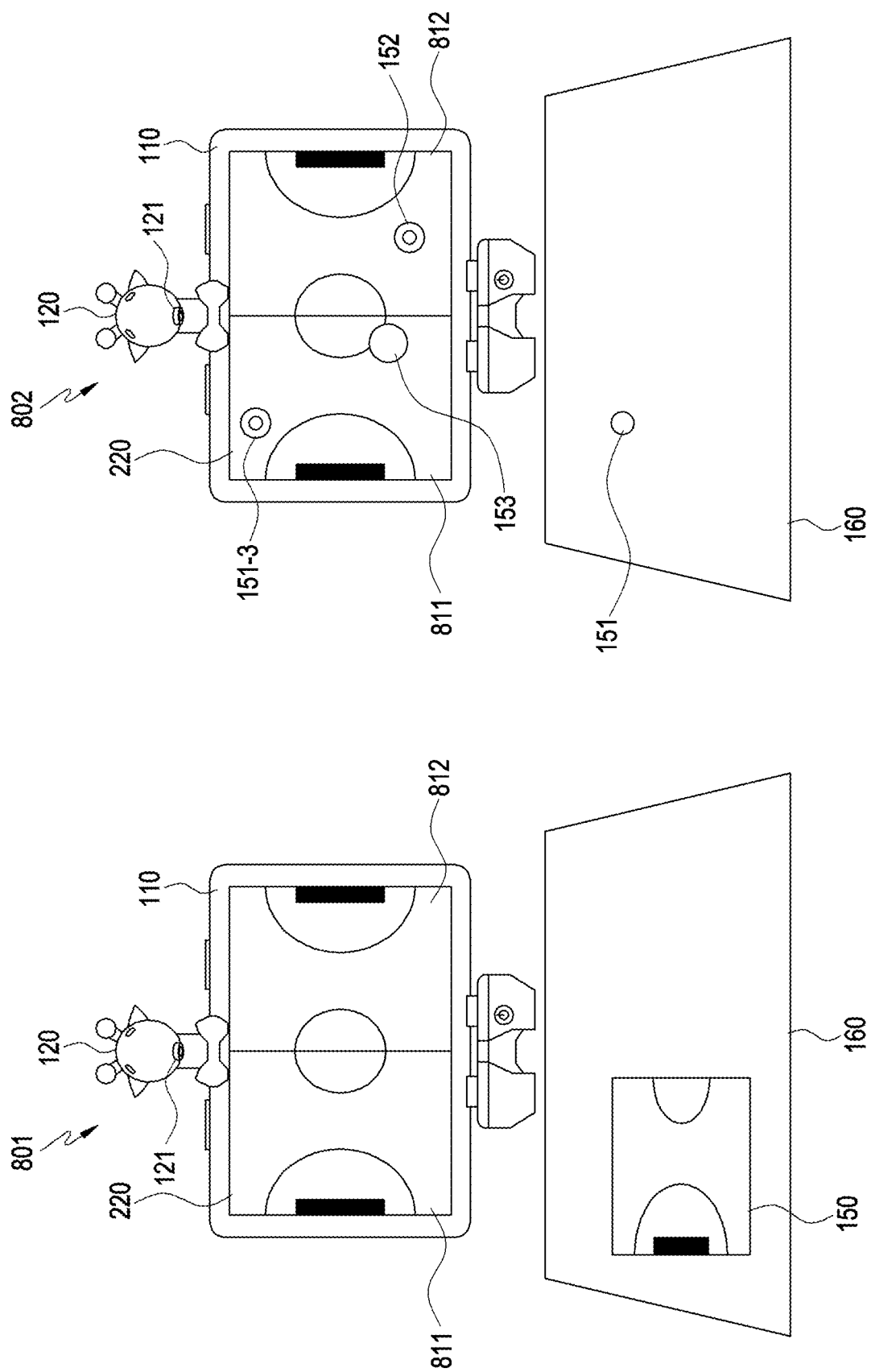
FIG. 8 is a view illustrating a method for providing content using a marker according to various embodiments.

FIG. 8 is a view 801 and 802 illustrating a method for providing content using a marker according to various embodiments.

Referring to FIGS. 7 and 8, in operation 701, according to an embodiment, the processor 250 may obtain an image for a marker through the camera (e.g., the first camera 121 or the second camera 111) while content is provided.

According to an embodiment, in reference number 801, the processor 250 may obtain an image for a marker 150 related to the hockey game through the camera. The processor 250 may obtain the content 811 (e.g., an image portion representing the hockey arena in the hockey game) corresponding to the marker 150 and the position of the marker 150. Although not shown in FIG. 8, the processor 250 may obtain content 812 related to the hockey game and corresponding to a marker (not shown) different from the marker 150 and the position of the different marker, based on information obtained from the external electronic device 130. The processor 250 may obtain content (e.g., the image representing the hockey arena where the hockey game is played) based on the content corresponding to the marker 150 and the position of the marker 150 and the content 812 corresponding to the different marker and the position of the different marker and display the obtained content through the display module 220.

According to an embodiment, the processor 250 may obtain the image for the marker (e.g., an item marker) through the camera while content (e.g., the image representing the hockey arena where the hockey game is played) is provided. For example, the processor 250 may obtain an image for an item marker 151 movable on the guide 160, through the camera.

In operation 703, according to an embodiment, the processor 250 may obtain the object corresponding to the marker and the position of the marker based on the image obtained through the camera (e.g., the first camera 121 or the second camera 111).

According to an embodiment, as shown in reference number 802, the processor 250 may obtain the object 151-3 corresponding to the item marker 151 and the position of the item marker 151, based on the image for the item marker 151 obtained through the camera (e.g., the first camera 121). For example, the processor 250 may obtain the object 151-3 corresponding to the image and/or text printed on the item marker 151, from the memory 240. The processor 250 may obtain the position of the item marker 151 by identifying the area of the item marker 151 in the area (or the image obtained through the camera) indicating the guide included in the image obtained through the camera (e.g., the first camera 121).

According to an embodiment, the processor 250 may obtain the object (e.g., the object 152) corresponding to an item marker different from the item marker 151 and the position of the different item marker, based on information obtained from the external electronic device 130 through the communication module 210.

In operation 705, according to an embodiment, the processor 250 may provide content based on the position of the marker.

According to an embodiment, in reference number 802, the processor 250 may provide content including the object 151-1 corresponding to the item marker 151 and the object 152 corresponding to the different item marker, based on the position of the item marker 151 and the position of the different item marker. For example, on the hockey game played through the electronic device 110 and the external electronic device 130, the object 151-1 corresponding to the item marker 151 may represent the game piece of the electronic device 110, and the oobject152 corresponding to the different item marker may represent the game piece of the external electronic device 130. According to an embodiment, when the item marker 151 is moved, the processor 250 may move and display the object 151-1 corresponding to the item marker 151 in the position of the display module 220 corresponding to the moved position of the item marker 151. When the different item marker is moved based on the information received from the external electronic device 130, the processor 250 may move and display the object 152 corresponding to the different item marker in the position of the display module 220 corresponding to the moved position of the different item marker. In reference number 802, the object 153 may correspond to the puck (e.g., a virtual puck) of the hockey game. When the object 153 contacts the object 151-1 corresponding to the item marker 151 or the object 152 corresponding to the different item marker, the object 153 may be moved from the current position to another position on the display module 220.

According to an embodiment, the processor 250 may play the content (e.g., hockey game) using the marker 151 (e.g., item marker) even without the marker 150 and the different marker used for obtaining the content, after obtaining (e.g., generating) the content (e.g., the combined content of the content 811 and the content 812). For example, upon obtaining the content (e.g., the combined content of the content 811 and the content 812) using the marker 150 and the different marker (e.g., when the hockey arena for playing hockey game is complete), the user of the electronic device 110 (and/or the user of the external electronic device 130) may move the marker 150 (and different marker) out of the field-of-view of the camera (e.g., the first camera 121) and move the marker 151 within the field-of-view of the camera. the processor 250 may provide the content using the marker 151 while the content (e.g., the combined content of the content 811 and the content 812) is provided. However, embodiments are not limited thereto. For example, when the user places or moves the marker 151 (and different marker) on the marker 150 (and different marker) in a state in which the position of the marker 150 (and different marker) is fixed, the processor 250 may provide the content (e.g., hockey game) based on the position of the marker 151 (and different marker).

Figure 9:
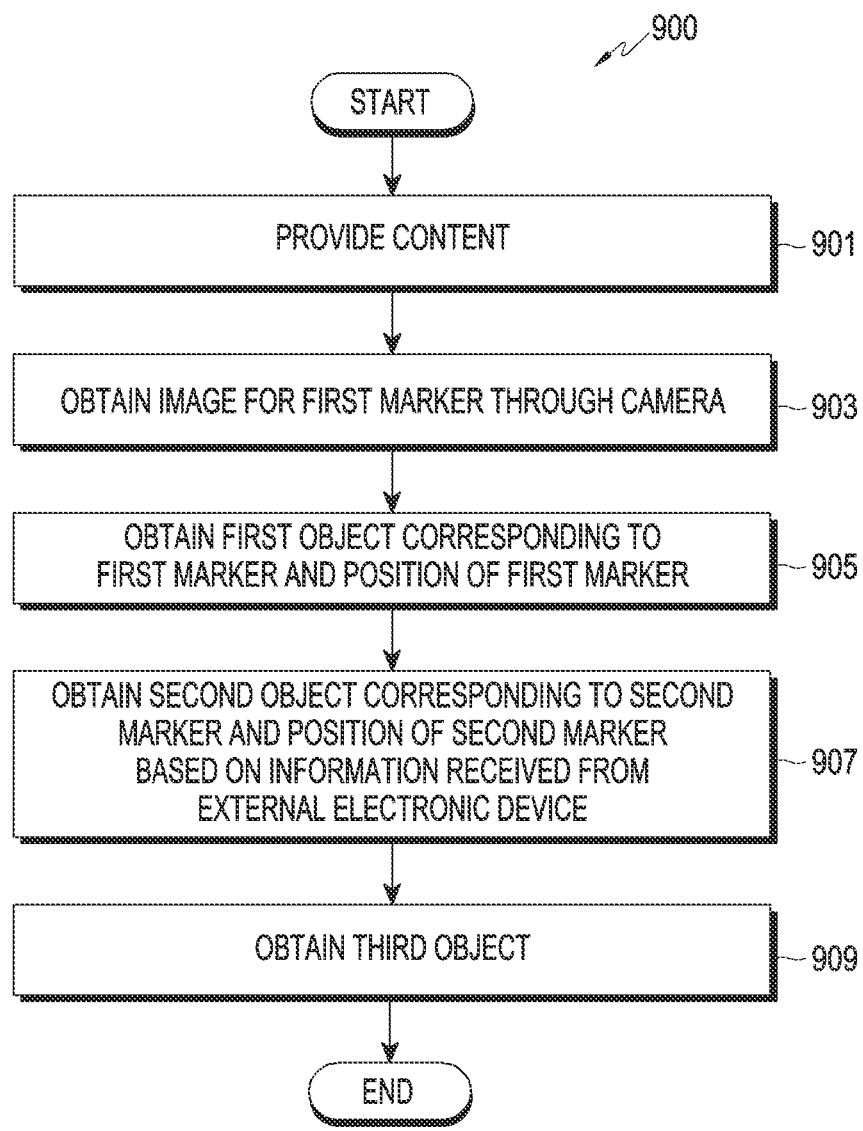
FIG. 9 is a flowchart illustrating a method for providing content using a marker according to various embodiments.

FIG. 9 is a flowchart 900 illustrating a method for providing content using a marker according to various embodiments.

Figure 10:
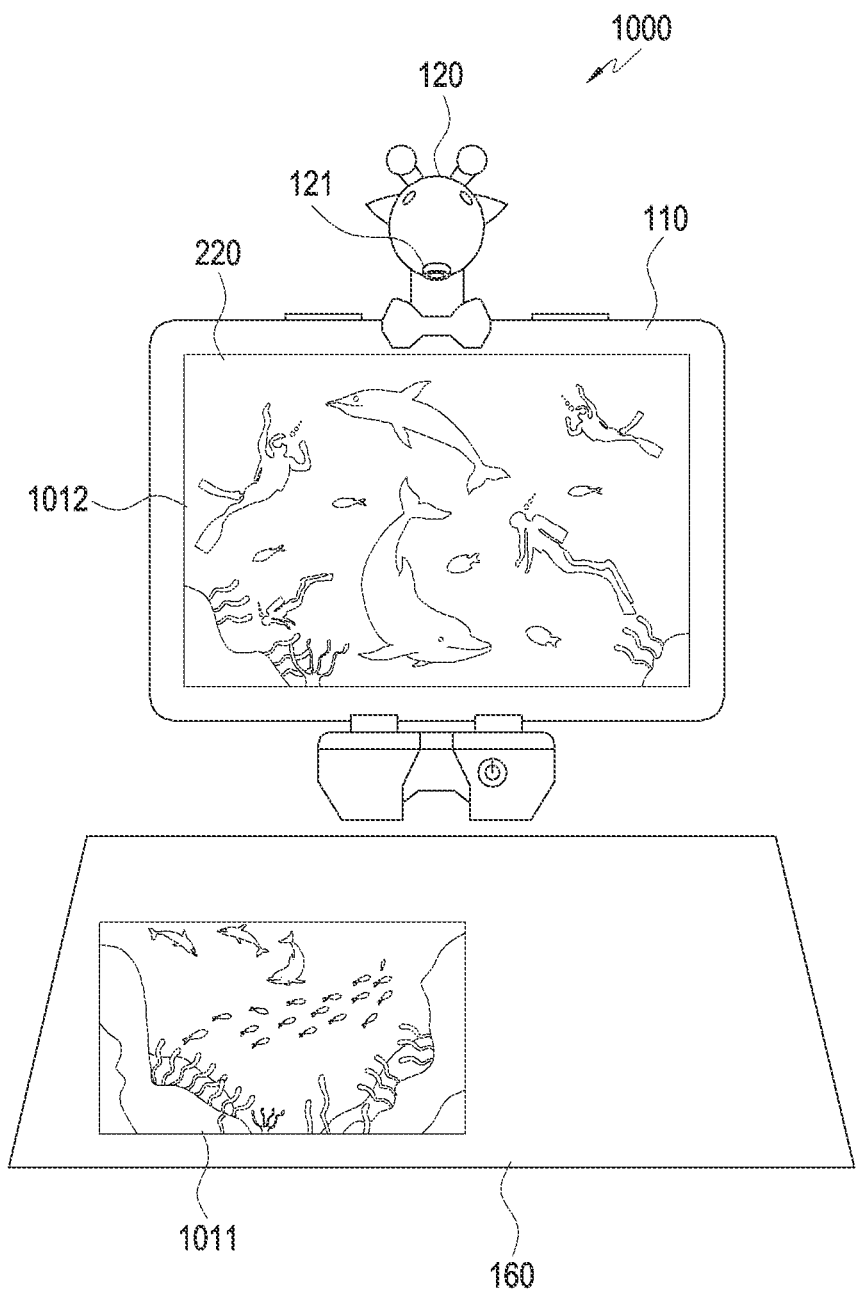
FIG. 10 is a view illustrating a method for providing content using a marker according to various embodiments.

FIG. 10 is a view 1000 illustrating a method for providing content using a marker according to various embodiments.

Figure 11:
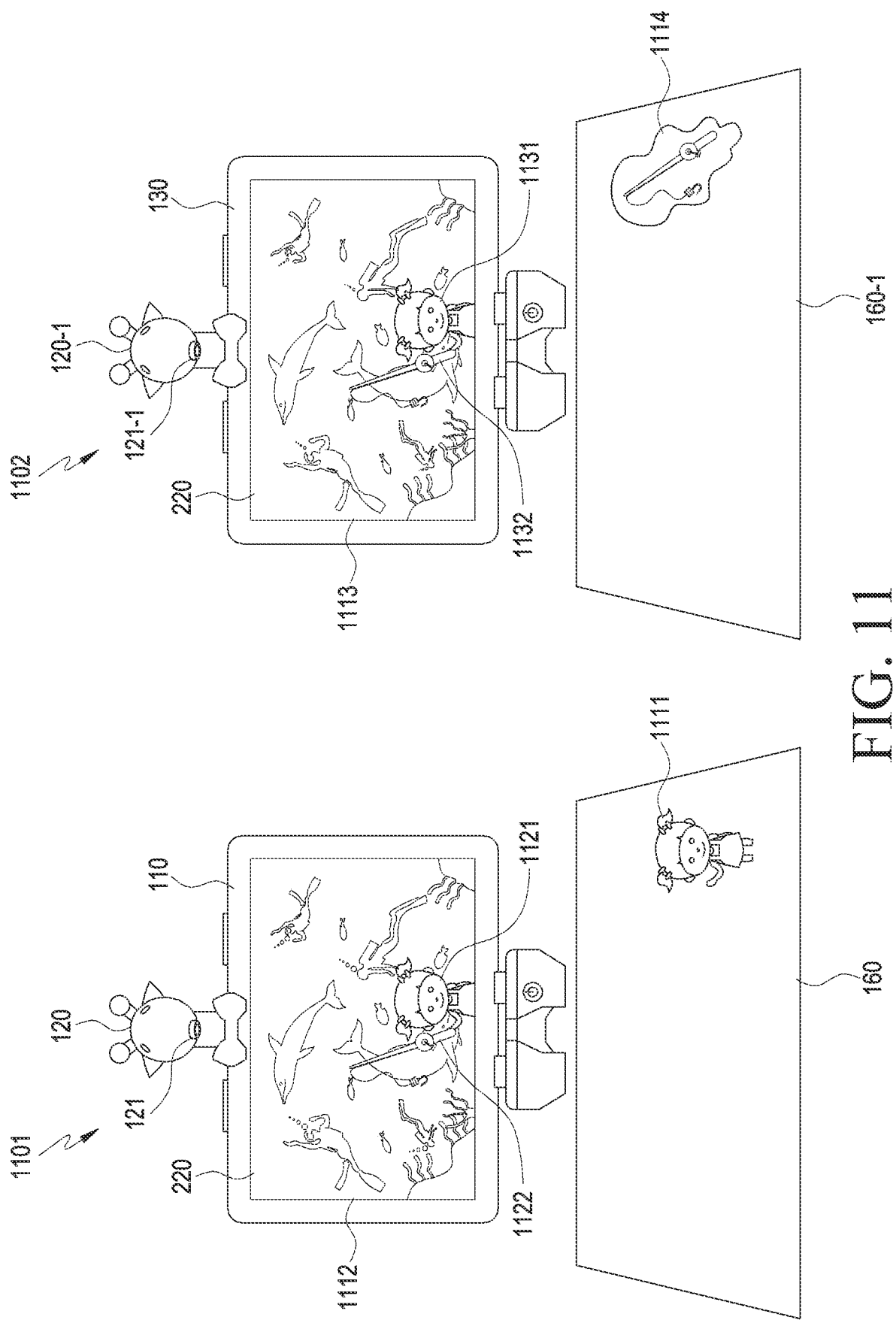
FIG. 11 is a view illustrating a method for providing an augmented reality effect using a marker according to various embodiments.

FIG. 11 is a view 1101 and 1102 illustrating a method for providing an augmented reality effect using a marker according to various embodiments.

Figure 12:
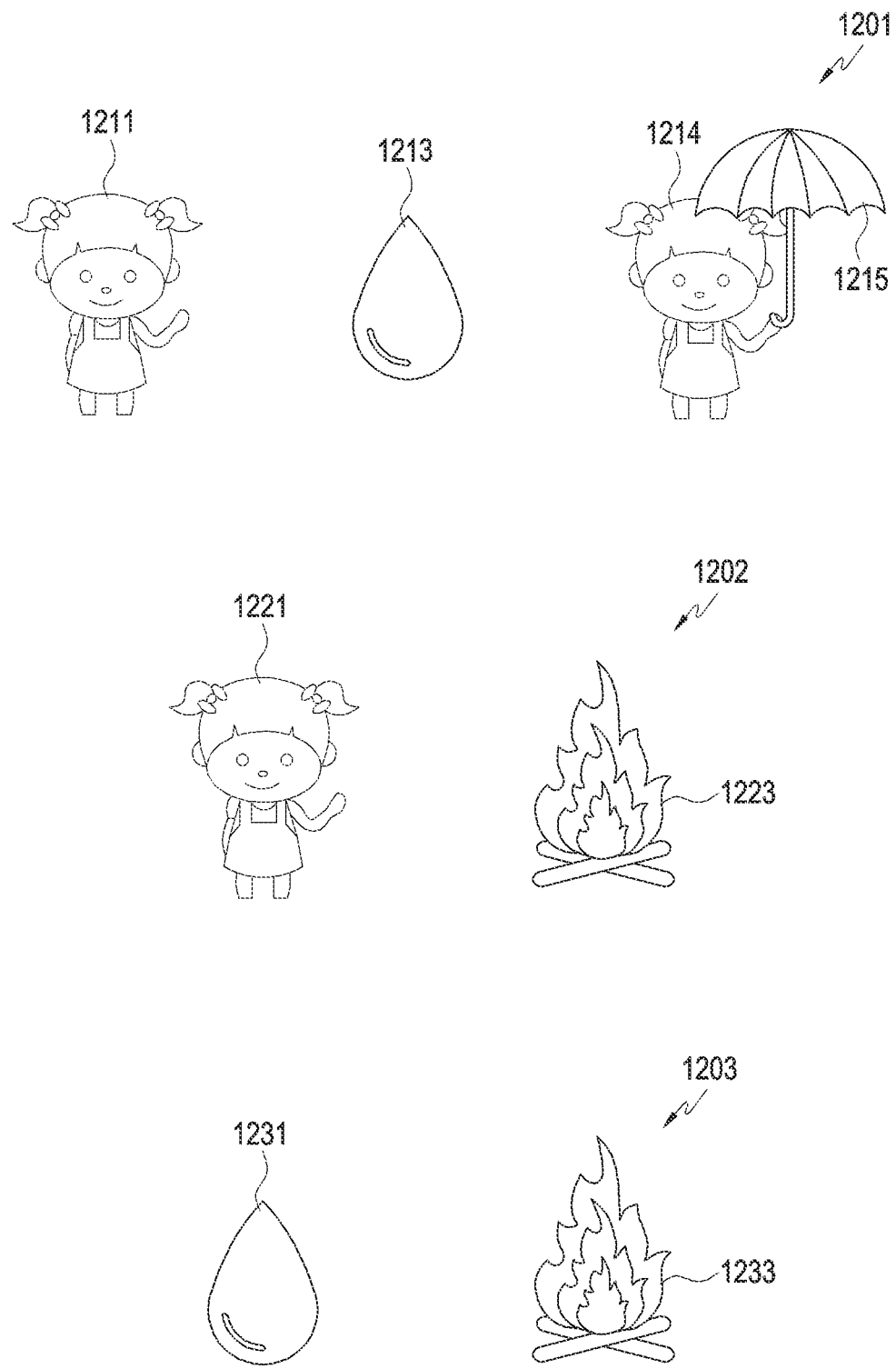
FIG. 12 is a view illustrating a method for providing an augmented reality effect using a marker according to various embodiments.

FIG. 12 is a view 1201, 1202, and 1203 illustrating a method for providing an augmented reality effect using a marker according to various embodiments.

Referring to FIGS. 9 to 12, in operation 901, according to an embodiment, the processor 250 may provide content using a marker.

According to an embodiment, the processor 250 may obtain an image for the marker through a camera (e.g., the first camera 121 or the second camera 111). The processor 250 may obtain content corresponding to the marker based on the obtained image. The processor 250 may identify an area indicating the image and/or text printed on the marker, in the image obtained through the camera. The processor 250 may obtain content (e.g., a game execution screen) corresponding to the identified area. For example, in FIG. 10, the processor 250 may obtain an image for a marker 1011 (and guide 160) printed with a sea-related image through the first camera 121. The processor 250 may identify the area indicating the sea-related image in the obtained image. The processor 250 may display an execution screen 1012 of a fishing game, as content corresponding to the sea-related image, through the display module 220.

According to an embodiment, the processor 250 may obtain content corresponding to the marker, based on information received from the external electronic device 130 through the communication module 210. For example, the processor 250 may receive the image for the marker from the external electronic device 130 through the communication module 210. The processor 250 may obtain content corresponding to the marker based on the received image. As another example, the processor 250 may receive the content corresponding to the marker from the external electronic device 130 through the communication module 210.

According to an embodiment, when a plurality of contents respectively corresponding to the plurality of markers, the processor 250 may assign priorities to the plurality of contents in the order in which the plurality of contents are obtained. For example, when content 1 corresponding to marker 1 is obtained based on an image for marker 1 obtained through the camera (e.g., the first camera 121 or the second camera 111), and content 2 corresponding to marker 2 (e.g., a marker as a target to be captured by the camera related to the external electronic device 130 of another user playing game together with the user of the electronic device 110) is obtained based on information received from the external electronic device 130, the processor 250 may assign a higher priority to content 1 obtained earlier than content 2. According to an embodiment, as the marker is first disposed within the field-of-view of the camera related to the external electronic device 130 and/or the field-of-view of the camera (e.g., the first camera 121 or the second camera 111) related to the electronic device 110 by the user of the electronic device 110 and/or the user of the external electronic device 130, the content corresponding to the marker may be first obtained.

According to an embodiment, the processor 250 may provide the content with the highest priority among the plurality of contents respectively corresponding to the plurality of markers. For example, the processor 250 may display, through the display module 220, only the content with the highest priority among the plurality of contents respectively corresponding to the plurality of markers.

According to an embodiment, after providing the content with the highest content among the plurality of contents respectively corresponding to the plurality of markers, the processor 250 may provide the content with the next highest priority. For example, after the fishing game corresponding to marker 1, as the content with the highest priority, is terminated, the processor 250 may provide a desert exploration game corresponding to marker 2 as the content with the second highest priority.

In operation 903, according to an embodiment, the processor 250 may obtain an image (hereinafter, referred to as a "first image") for the first marker through the camera.

According to an embodiment, the processor 250 may obtain the first image for the first marker through the camera (e.g., the first camera 121 or the second camera 111) while content is provided.

According to an embodiment, the first marker may include a marker having at least one surface printed with an image and/or text related to the item. For example, the first marker may be a marker having at least one surface printed with a character-related image. As another example, the first marker may be a marker having at least one surface printed with an image related to equipment and/or clothes that may be put on the character. However, the first marker is not limited to those described above.

In operation 905, according to an embodiment, the processor 250 may obtain a first object corresponding to the first marker and the position of the first marker.

According to an embodiment, the processor 250 may obtain the first object corresponding to (e.g., mapped to) the first marker (hereinafter, denoted as a "first object") based on the first image for the first marker. For example, the processor 250 may recognize the image (and/or text) e.g., a character-related image, printed on at least one surface of the first marker in the first image. The processor 250 may identify the object (e.g., the object representing the character) mapped to the recognized image and stored in the memory 240.

According to an embodiment, the processor 250 may obtain the position of the first marker based on the first image. For example, the processor 250 may identify the position of the area of the guide in the first image (e.g., the area indicating the guide in the first image) and the position of the area of the first marker (e.g., the image area indicating the first marker in the first image). The processor 250 may determine that the position of the area of the first marker in the area of the guide is the position of the first marker. As another example, the processor 250 may identify that the first image does not include the area of the guide. In this case, the processor 250 may identify the position of the area of the first marker in the first image (e.g., the first image corresponding to the field-of-view of the camera). The processor 250 may determine that the identified position of the first marker in the first image is the position of the first marker.

In operation 907, according to an embodiment, the processor may obtain the second object corresponding to the second marker and the position of the second marker, based on information received from the external electronic device 130 through the communication module.

According to an embodiment, the second marker may be a marker that is a target to be captured by the camera device 121-1 obtaining an image and transmitting the obtained image to the external electronic device 130 or the camera module included in the external electronic device 130. Identical or similar to the first marker, the second marker may include a marker having at least one surface printed with an image and/or text related to the item.

According to an embodiment, the processor 250 may receive information including the second object corresponding to the second marker (hereinafter, denoted as a "second object") and the position of the second marker, from the external electronic device 130 (or server) through the communication module 210. According to an embodiment, the external electronic device 130 may perform substantially the same operations as operations 901 and 905 described above. For example, the external electronic device 130 may obtain the image for the second marker through a camera related to the external electronic device 130 (e.g., the camera device obtaining the image and transmitting the obtained image to the external electronic device 130 or the camera module included in the external electronic device 130). The external electronic device 130 may obtain the second object corresponding to the second marker and the position of the second marker based on the obtained image. The external electronic device 130 may transmit information including the obtained second object and position of the second marker to the electronic device 110. The electronic device 110 may receive, through the communication module 210, the information including the second object and the position of the second marker, transmitted by the external electronic device 130.

According to an embodiment, the processor 250 may receive information including the image for the second marker (hereinafter, denoted as a "second image") from the external electronic device 130 (or server) through the communication module 210. The processor 250 may obtain the second object corresponding to the second marker and the position of the second marker based on the second image. For example, the processor 250 may obtain the second object corresponding to the second marker, based on the second image. The processor 250 may recognize the image (and/or text) printed on at least one surface of the second marker in the second image. The processor 250 may identify the second object mapped to the recognized image and stored in the memory 210. The processor 250 may obtain the position of the second marker based on the second image. For example, the processor 250 may identify the position of the area of the guide in the second image (e.g., the area indicating the guide in the second image) and the position of the area of the second marker (e.g., the image area indicating the second marker in the second image). The processor 250 may determine that the position of the area of the second marker in the area of the guide is the position of the second marker. As another example, the processor 250 may determine that the identified position of the second marker in the second image is the position of the second marker.

In operation 909, according to an embodiment, the processor 250 may obtain the third object by combining the first object and the second object based on the position of the first marker and the position of the second marker.

According to an embodiment, the processor 250 may identify that at least part of the first object and at least part of the second object overlap on the screen displayed through the display module 220, based on the position of the first marker and the position of the second marker. When at least part of the first object and at least part of the second object overlap, the processor 250 may obtain a third object in which the first object and the second object are combined together. For example, referring to reference numbers 1101 and 1102, the processor 250 may identify that the first object 1121 corresponding to the first marker 1111 (e.g., the marker printed with an image representing a character) and the second object 1122 corresponding to the second marker 1114 (e.g., the marker printed with an image representing a fishing rod) overlap on the screen 1112 (e.g., the screen displaying the content provided through operation 901) displayed through the display module 220. When the first object 1121 and the second object 1122 overlap, the processor 250 may obtain the third object in which the first object 1121 and the second object 1122 are combined (e.g., an object representing an image in which the fishing rod represented by the second object 1122 is mounted on the character represented by the first object 1121). Although not shown in reference numbers 1101 and 1102, when the third object is obtained, the processor 250 may provide content to allow the user of the electronic device 110 and/or the user of the external electronic device 130 to play game using the third object. For example, the processor 250 may provide a game in which the character with the fishing rod is fishing using the fishing rod in the sea-related content to the user of the electronic device 101 and/or the user of the external electronic device 130.

According to an embodiment, as shown in reference numbers 1101 and 1102, when the third object is obtained, the processor 250 may transmit, to the external electronic device 130 through the communication module, information related to the third object to allow the external electronic device 130 to display the screen 1113 (e.g., a screen including the same object 1131 as the first object 1121 and the same object 1132 as the second object 1122) identical to the screen 1112 displayed on the electronic device 110.

Although not shown in FIG. 9, according to an embodiment, the processor 250 may obtain objects using various markers. For example, in reference number 1201, the processor 250 may obtain an object 1215 which is augmented with an item 1215 representing an umbrella on the character 1214 and in which the object corresponding to the marker 1211 and the object corresponding to the marker 1213 are combined (e.g., generated based on the object corresponding to the marker 1211 and the object corresponding to the marker 1213), using the marker 1211 printed with an image representing the character and the marker 1213 printed with an image representing a water droplet.

Although not shown in FIGS. 9 to 12, according to an embodiment, when an object corresponding to a marker is obtained while content is provided through operation 901, the processor 250 may obtain an object resultant from changing at least part of the obtained object, based on the provided content. For example, when the object 1121 representing the character and corresponding to the first marker 1111 printed with the character-related image is obtained while the sea-related content is provided, the processor 250 may obtain an object in which the sea-related swimsuit is augmented with the character of the object 1121. As another example, when an object 1121 representing a character and corresponding to the first marker 1111 printed with a character-related image is obtained while the jungle-related content is provided, the processor 250 may obtain an object in which a jungle-related exploration suit is augmented with the character of the object 1121.

According to an embodiment, the processor 250 may apply an augmented reality effect (e.g., an animation effect) to the content provided through the display module 220, using various markers. For example, when the third object is obtained based on the first object and the second object, the processor 250 may apply an augmented reality effect corresponding to the combination of the first object and the second object to the content being provided.

According to an embodiment, when an object corresponding to the marker 1221 printed with the character-related image and an object corresponding to the marker 1223 printed with an image representing a flame while a cave-related content is provided in reference number 1202, the processor 250 may display such an augmented reality effect as if the surroundings of the character brighten along with the object representing an image in which the flame is augmented with the character in the content related to the cave, through the display module 220. For example, in reference number 1203, when an object corresponding to the marker 1233 printed with an image representing a flame and an object corresponding to the marker 1231 printed with a water-related image are obtained while an ice-related content is provided, the processor 250 may display such an augmented reality effect as if the ice melts into water in the ice-related content, through the display module 220.

According to an embodiment, in the above-described examples, the operation in which the electronic device provides content using markers is exemplified, but the embodiments are not limited thereto. In the above-described examples, some of the operations performed by the electronic device may be performed by the server 140.

According to an embodiment, a method for providing content using a marker by an electronic device may comprise obtaining an image for a first marker through a camera, obtaining a first content corresponding to the first marker and a position of the first marker, based on the image, obtaining a second content corresponding to a second marker and a position of the second marker, based on information received from an external electronic device, and obtaining a third content by combining the first content and the second content based on the position of the first marker and the position of the second marker.

According to an embodiment, obtaining the image may comprise obtaining the image for the first marker through a camera of a camera device communicatively connected with the electronic device or a camera of the electronic device.

According to an embodiment, the position of the first marker may be a position within a first guide on which the first marker is disposed or a position within a field-of-view of the camera, and the position of the second marker may be a position within a second guide on which the second marker is disposed or a position within a field-of-view of a camera related to the external electronic device.

According to an embodiment, obtaining the third content may comprise obtaining the third content by combining the first content to be displayed in a first screen area corresponding to the position of the first marker among a plurality of screen areas of a display module of the electronic device and the second content to be displayed in a second screen area corresponding to the position of the second marker among the plurality of screen areas.

According to an embodiment, the method may further comprise obtaining a position of a connection marker obtained through the camera, based on an image for the connection marker and obtaining a content to be displayed in a third screen area, based on the first content and the second content, when the position of the connection marker corresponds to the third screen area adjacent to the first screen area and/or the second screen area, wherein obtaining the third content may comprises obtaining the third content by combining the first content, the second content, and the content to be displayed in the third screen area.

According to an embodiment, the first marker and the second marker may include puzzle markers. The first content and the second content may include parts of a puzzle map. The third content may include the puzzle map.

According to an embodiment, the method may further comprise, when a position of the first content is identical to a position of the second content, assigning a higher priority to a marker in a position obtained earlier of the position of the first marker and the position of the second marker and displaying only a content corresponding to the marker assigned the higher priority, on a display module of the electronic device.

According to an embodiment, the method may further comprise obtaining an image for a third marker through the camera while the third content is provided, obtaining an object corresponding to the third marker and a position of the third marker, based on the image for the third marker, and providing the third content using the third marker, based on the position of the third marker.

According to an embodiment, a non-transitory computer-readable medium storing one or more programs may comprise instructions configured to, when executed by at least one processor of an electronic device, enable the electronic device to obtain an image for a first marker through a camera, obtain a first content corresponding to the first marker and a position of the first marker, based on the image, obtain a second content corresponding to a second marker and a position of the second marker, based on information received from an external electronic device, and obtain a third content by combining the first content and the second content based on the position of the first marker and the position of the second marker.

According to an embodiment, the instructions may be configured to, when executed by the at least one processor, enable the electronic device to obtain the image for the first marker through a camera of a camera device communicatively connected with the electronic device or a camera of the electronic device.

According to an embodiment, the position of the first marker may be a position within a first guide on which the first marker is disposed or a position within a field-of-view of the camera, and the position of the second marker may be a position within a second guide on which the second marker is disposed or a position within a field-of-view of a camera related to the external electronic device.

According to an embodiment, the instructions may be configured to, when executed by the at least one processor, enable the electronic device to obtain the third content by combining the first content to be displayed in a first screen area corresponding to the position of the first marker among a plurality of screen areas of a display module of the electronic device and the second content to be displayed in a second screen area corresponding to the position of the second marker among the plurality of screen areas.

According to an embodiment, the instructions may be configured to, when executed by the at least one processor, enable the electronic device to obtain a position of a connection marker obtained through the camera, based on an image for the connection marker, obtain a content to be displayed in a third screen area, based on the first content and the second content, when the position of the connection marker corresponds to the third screen area adjacent to the first screen area and/or the second screen area, and obtain the third content by combining the first content, the second content, and the content to be displayed in the third screen area.

According to an embodiment, the first marker and the second marker may include puzzle markers. The first content and the second content may include parts of a puzzle map. The third content may include the puzzle map.

According to an embodiment, the instructions may be configured to, when executed by the at least one processor, enable the electronic device to, when a position of the first content is identical to a position of the second content, assign a higher priority to a marker in a position obtained earlier of the position of the first marker and the position of the second marker and display only a content corresponding to the marker assigned the higher priority, on a display module of the electronic device.

According to an embodiment, the instructions may be configured to, when executed by the at least one processor, enable the electronic device to obtain an image for a third marker through the camera while the third content is provided, obtain an object corresponding to the third marker and a position of the third marker, based on the image for the third marker, and provide the third content using the third marker, based on the position of the third marker.

According to an embodiment, a method for providing content using a marker by an electronic device may comprise obtaining an image for a first marker through a camera while the content is provided, obtaining a first object corresponding to the first marker and a position of the first marker, based on the image, obtain a second object corresponding to a second marker and a position of the second marker, based on information received from an external electronic device, and obtain a third object by combining the first object and the second object based on the position of the first marker and the position of the second marker.

According to an embodiment, obtaining the third object may comprise obtaining the third object in which the first object and the second object are combined, when at least part of the first object and at least part of the second object overlap each other.

According to an embodiment, the method may further comprise obtaining an object in which at least part of the first object and/or the second object is changed, based on the content when the first object and/or the second object is obtained while the content is provided.

According to an embodiment, the method may further comprise applying an augmented reality effect corresponding to the combination of the first object and the second object to the content when the third object is obtained.

Further, the structure of the data used in embodiments may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

What is claimed is:
1. A method for providing content using a marker by an electronic device, the method comprising:
  based on an application related to the content being executed, splitting a screen of a display module of the electronic device of a first user into a plurality of screen areas;
  obtaining, by a processor of the electronic device, an image for a first marker through a camera of the electronic device;

obtaining, by the processor, a first content corresponding to the first marker and a position of the first marker, based on the image;
based on information received from an external electronic device of a second user, obtaining, by the processor, a second content corresponding to a second marker and a position of the second marker, wherein the second content corresponding to the second marker and the position of the second marker is obtained based on an image for the second marker, the image for the second marker being obtained by a camera of the external electronic device;
based on the position of the first marker and the position of the second marker, obtaining, by the processor, a third content by combining the first content and the second content; and
displaying, through the display module, the third content on a first screen area and a second screen area, the first screen area corresponding to the position of the first marker and the second screen area corresponding to the position of the second marker being included in the plurality of screen areas,
wherein the method further comprises:
when the first screen area corresponding to the position of the first marker is identical to the second screen area corresponding to the position of the second marker, assigning, by the processor, a higher priority to a marker, between the first marker and the second marker, in a position obtained earlier of the position of the first marker and the position of the second marker; and
displaying, through the display module by the processor, only a content corresponding to the marker to which the higher priority is applied between the first content and the second content, wherein the content corresponding to the marker to which the higher priority is applied is displayed through a display module of the external electronic device.

2. The method of claim 1,
wherein the position of the first marker is a position within a first guide on which the first marker is disposed or a position within a field-of-view of the camera of the electronic device, and
wherein the position of the second marker is a position within a second guide on which the second marker is disposed or a position within a field-of-view of the camera of the external electronic device.

3. The method of claim 1, further comprising:
obtaining a position of a connection marker obtained through the camera of the electronic device, based on an image for the connection marker; and
obtaining a content to be displayed in a third screen area, based on the first content and the second content, when the position of the connection marker corresponds to the third screen area adjacent to the first screen area and the second screen area,
wherein obtaining the third content comprises obtaining the third content by combining the first content, the second content, and the content to be displayed in the third screen area.

4. The method of claim 1,
wherein the first marker and the second marker include puzzle markers,
wherein the first content and the second content include parts of a puzzle map, and
wherein the third content includes the puzzle map.

5. The method of claim 1, further comprising:
obtaining an image for a third marker through the camera of the electronic device while the third content is provided;
obtaining an object corresponding to the third marker and a position of the third marker, based on the image for the third marker; and
providing the third content using the third marker, based on the position of the third marker.

6. A non-transitory computer-readable medium storing one or more programs comprising instructions that, when executed by at least one processor of an electronic device, cause the electronic device to:
based on an application related to content being executed, split a screen of a display module of the electronic device of a first user into a plurality of screen areas;
obtain an image for a first marker through a camera of the electronic device;
obtain a first content corresponding to the first marker and a position of the first marker, based on the image;
based on information received from an external electronic device of a second user, obtain a second content corresponding to a second marker and a position of the second marker, wherein the second content corresponding to the second marker and the position of the second marker is obtained based on an image for the second marker, the image for the second marker being obtained by a camera of the external electronic device;
based on the position of the first marker and the position of the second marker, obtain a third content by combining the first content and the second content; and
display, through the display module, the third content on a first screen area and a second screen area, the first screen area corresponding to the position of the first marker and the second screen area corresponding to the position of the second marker being included in the plurality of screen areas,
wherein the instructions, when executed by the at least one processor, further cause the electronic device to:
when the first screen area corresponding to the position of the first marker is identical to the second screen area corresponding to the position of the second marker, assign a higher priority to a marker, between the first marker and the second marker, in a position obtained earlier of the position of the first marker and the position of the second marker; and
display, through the display module, only a content corresponding to the marker to which the higher priority is applied between the first content and the second content, wherein the content corresponding to the marker to which the higher priority is applied is displayed through a display module of the external electronic device.

7. The non-transitory computer-readable medium of claim 6,
wherein the position of the first marker is a position within a first guide on which the first marker is disposed or a position within a field-of-view of the camera of the electronic device, and
wherein the position of the second marker is a position within a second guide on which the second marker is disposed or a position within a field-of-view of the camera of the external electronic device.

8. The non-transitory computer-readable medium of claim 6, wherein the instructions that, when executed by the at least one processor, cause the electronic device to:

obtain a position of a connection marker obtained through the camera of the electronic device, based on an image for the connection marker;

obtain a content to be displayed in a third screen area, based on the first content and the second content, when the position of the connection marker corresponds to the third screen area adjacent to the first screen area and the second screen area; and obtain the third content by combining the first content, the second content, and the content to be displayed in the third screen area.

9. The non-transitory computer-readable medium of claim 6, wherein the first marker and the second marker include puzzle markers, wherein the first content and the second content include parts of a puzzle map, and wherein the third content includes the puzzle map.

10. The non-transitory computer-readable medium of claim 6, wherein the instructions that, when executed by the at least one processor, cause the electronic device to:

obtain an image for a third marker through the camera of the electronic device while the third content is provided;

obtain an object corresponding to the third marker and a position of the third marker, based on the image for the third marker; and provide the third content using the third marker, based on the position of the third marker.

* * * * *